United States Patent [19]

Ulrich

[11] Patent Number: 5,556,227
[45] Date of Patent: Sep. 17, 1996

[54] ROAD FINISHER

[75] Inventor: Alfred Ulrich, Gorxheimertal, Germany

[73] Assignee: Joseph Vögele AG, Germany

[21] Appl. No.: 426,126

[22] Filed: Apr. 20, 1995

[30] Foreign Application Priority Data

Apr. 21, 1994 [DE] Germany ............................. 9406683 U

[51] Int. Cl.⁶ .................................................. E01C 19/28
[52] U.S. Cl. ........................ 404/101; 404/118; 404/103; 404/108
[58] Field of Search ................................. 404/72, 84, 96, 404/101, 108, 118; 37/234, 235, 236

[56] References Cited

U.S. PATENT DOCUMENTS

| 3,362,307 | 1/1968 | Domenighetti | 404/113 |
| 4,026,658 | 5/1977 | Nevendorf et al. | 404/84 |
| 4,759,657 | 7/1988 | Döor et al. | 404/72 |

FOREIGN PATENT DOCUMENTS

| 665365 | 10/1965 | Belgium . |
| 0217408 | 4/1987 | European Pat. Off. . |
| 2666104 | 2/1992 | France . |
| 2856583 | 6/1980 | Germany . |

Primary Examiner—Michael Powell Buiz
Assistant Examiner—Pamela A. O'Connor
Attorney, Agent, or Firm—Finnegan, Henderson, Farabow, Garrett & Dunner, L.L.P.

[57] ABSTRACT

A road finisher comprising a chassis is described, the chassis being movable on a travelling gear and carrying a front stock hopper, a primary drive unit an incorporated secondary drive units. The road finisher is provided with a paving screed which is dragged at the rear and which is articulated on the chassis via lateral outriggers, as well as with a lifting device which is provided between the chassis and the outrigger and by means of which the paving screed can be moved to a transport position raised from the ground. The troublesome influence of the paving screed when the road finisher travels for the purpose of transportation is reduced or eliminated to a large extent in the case of such a road finisher. For this purpose, the road finisher is provided with a dynamic absorber system comprising an actuable support for the paving screed occupying the transport position, the support being elastic relative to the chassis and effective in the lowering direction, as well as an absorber mass defined by the paving screed.

13 Claims, 3 Drawing Sheets

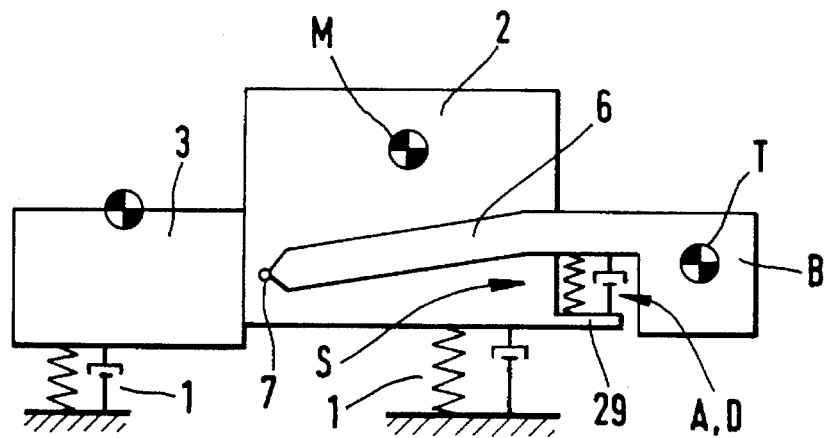
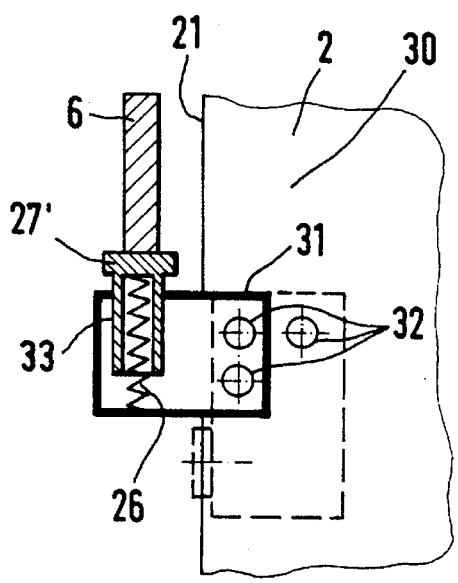
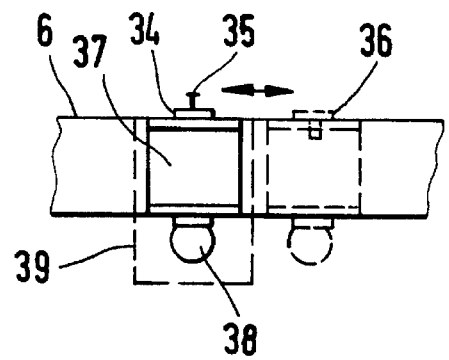
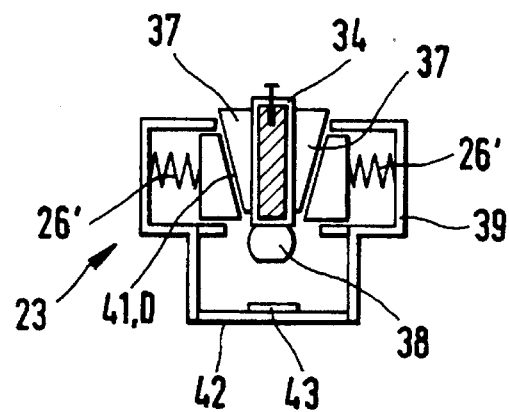

ROAD FINISHER

FIELD OF THE INVENTION

The present invention refers to a road finisher having a chassis which is movable on a travelling gear and which carries a front stock hopper, a primary drive unit and incorporated secondary drive units. A paving screed is dragged at the rear and is articulated on the chassis via lateral outriggers. In addition, a lifting device is provided between the chassis and outriggers so that the paving screed can be moved to a transport position where it is raised above the ground.

BACKGROUND OF THE INVENTION

When a road finisher travels for the purpose of carrying out a road finishing operation, the paving screed dragged at the rear distributes the material, which is transported from a stock hopper to the rear and deposited and spread in front of the paving screed, such that a level, smooth and compacted road surface layer is produced. The road finisher travels at low speed while it is in operation (only a few meters per minute). The lifting device is passive, i.e. the paving screed is in a floating position at which it rests on the road surface layer and carries out movements relative to the chassis of the road finisher. Transport of the road finisher to a different building site is carried out by means of a low loader in most cases. For this purpose, the paving screed is raised by the lifting device and fixed at the transport position. On the low loader, the paving screed can even be placed on a base. Minor transport distances, e.g. in cases in which damaged road surfaces have to be repaired, are covered by the road finisher which will then travel independently at speeds of 25 km/h or more. When occupying the transport position, the paving screed is normally not only held at a raised position by means of the lifting device but also placed on strong stop means via which the vibrations of the paving screed are transmitted unfiltered and unreduced to the chassis of the road finisher. Due to its heavy weight and due to the fact that its mass gravity centre is located at a comparatively long distance behind the chassis, the paving screed will cause the road finisher to carry out pitch motions which may be troublesome to the driver or even critical, or it will aggravate existing pitch motions of the road finisher. In extreme cases, this will even jeopardize the road safety when the road finisher is travelling for the purpose of transportation.

It is the object of the present invention to provide a road finisher of the type mentioned above in the case of which the troublesome influence of the paving screed during transportation has been reduced or eliminated to a large extent.

SUMMARY OF THE INVENTION

In accordance with the present invention, this object is achieved by providing a road finisher comprising a chassis, which is movable on a travelling gear and which carries a front stock hopper, a primary drive unit and incorporated secondary drive units, a paving screed is dragged at the rear and which is articulated on the chassis via lateral outriggers, and a lifting device is provided between the chassis and said outrigger and by means of which the paving screed can be moved to a transport position raised from the ground, characterized in that the road finisher (F) is provided with a dynamic absorber system (S) comprising an actuable support (A) for the paving screed (B) occupying the transport position, said support (A) being elastic relative to the chassis (2) and effective in the lowering direction, as well as an absorber mass (T) defined by the paving screed (B).

In the case of this structural design, the lowering movements of the paving screed, which result from rough road surfaces, are not directly transmitted to the chassis of the road finisher, but reduced and damped via the actuated support so that the road finisher will show less tendency to carry out pitch motions while travelling for the purpose of transportation. The mass of the paving screed acts in combination with the elastic support, which represents a sort of spring-damper element in the kinematic chain between the chassis and the paving screed, as a dynamic vibration absorber in which the paving screed acts as an absorber mass. In principle, a resonant system is created, which is attached to the vibrating structure of the road finisher and which counteracts the vibrations of the road finisher which are caused by rough road surfaces, i.e. it also counteracts the vibrations of the chassis and of the stock hopper. It will be expedient to adapt the absorber mass and the elastic support to the overall system of the road finisher in such a way that a damping degree between zero and infinite is obtained, the main system carrying out the smallest vibrations. The optimum damping degree for the respective road finisher can be determined for each individual road finisher with the aid of simple means, said optimum damping degree being a function of the mass ratio between the absorber mass and the main mass of the road finisher. The pitch motions of the road finisher can essentially be reduced in this way, the mass of the paving screed being caused to carry out vibrating movements relative to the mass of the road finisher.

It is true that DE-C-28 56 583 discloses that, in the case of a tractor having a three-point linkage device for a rear mounted and/or front mounted implement, a vibration absorber is provided on the upper connecting rod as well as on the lower connecting rod of said three-point linkage device and that the two vibration absorbers are caused to act on the resonances of the pitch and lift vibrations, with the mass of the implement acting as a common absorber mass, but the conditions existing in the case of a three-point linkage device with upper and lower connecting rods and with the respective implement cannot be compared with the circumstances which have to be dealt with in the case of a road finisher, and, in addition, the tractor uses both the lifting movements and the lowering movements for reducing the vibrations of the main mass.

In a preferred embodiment, it is possible to adjust the optimum damping degree by an additional damping means, which is integrated in the support in an expedient manner, so that the pitch vibrations can be suppressed to a very large extent when the road finisher is travelling for the purpose of transportation.

In another embodiment, a structurally simple and functionally reliable embodiment is disclosed. The accumulator acts in the control circuit as the elastic and actuable support permitting the absorber mass to carry out vibrations relative to the main mass. The damping resistor causes, by means of a throttling effect, a mechanical damping in the flow of pressure medium from and to the accumulator. Energy is consumed and a simple and optimum adaptation of the dynamic absorber system is made possible because the relative frequency conditions and the damping degree can be adjusted. The lowering movements of the paving screed are dealt with in the dynamic absorber system and the mass forces occurring during lowering movements are utilized, i.e. forces are utilized which are directed downwards and which change with regard to their value but not with regard to their direction. This is an essential difference between the present invention and the absorption system known from DE-C- 28 56 583, which provides a separate vibration absorber for each direction of movement and which makes these vibration absorbers work in combination. It is a surprising aspect that, in the case of a road finisher, the lowering movements alone suffice to effectively quiet the chassis.

Still another embodiment is simple from the point of view of control technology and it is reliable. Road finishers which have already been in operation can easily be re-equipped subsequently by connecting to one hydraulic line thereof at least one accumulator via a control valve and a damping restrictor. The control valve is, in an expedient manner, only switched through if the multi-way valve for the lifting device has been adjusted to transport/supported position do that the dynamic absorber system of the road finisher does not become effective when the road finisher travels for the purpose of carrying out a road finishing operation.

An alternative, structurally simple and robust embodiment is also disclosed. As soon as the lifting device has raised the paving screed to the transport position, the stop member, on which the outrigger can rest in the vertical direction, will be moved to its operating position. The lifting device can then be switched to the floating position.

The spring device may have an arbitrary structural design provided that it produces, directly or indirectly, the necessary damping effect.

A further embodiment guarantees that, in the case of an excessive deflection of the paving screed, the dynamic absorber system is bridged at least for a short period of time, without there being any risk that the paving screed hits the ground or causes damage to other parts of the road finisher.

A structurally simple embodiment is the embodiment wherein the locking member can be accommodated such that it takes up extremely little space and it transmits the vibrations and the mass forces via the spring means to the chassis and vice versa.

Another embodiment has the advantage that, when the road finisher travels for the purpose of carrying out a road finishing operation, the locking member is hidden with the chassis and that it is only displaced outwards when it is used for absorbing vibrations. Absorbing the mass forces in the area of the side wall is advantageous from the statical point of view.

Yet another embodiment permits easy handling of the dynamic absorber system because the locking member is adapted to be adjusted by remote control in the respective direction of movement.

In alternative embodiment, the housing transmits the mass forces to the chassis, most expediently to the back wall of the chassis. This has the effact that a lever arm of optimum dimensions is obtained between the point of articulation of the outrigger an the elastic support. Handling is easy. It suffices to remove the housing and to reattach it at the respective other position as soon as each outrigger has been raised. The piston permits an accurate transmission of movements and of the respective forces to the spring means.

According to one embodiment, it is expedient to provide the stationary safety limit stop between the piston and the housing.

In connection with the mechanical-dynamical absorber systems, it is advantageous and particularly important that vibration absorption takes place in a largely independent manner and in addition to the effect produced by the lifting device as well as only within a limited range, viz. only in cases in which the lifting device is no longer effective and only until the outriggers are caught by the stationary supports. In connection with road finishers, the dynamic absorber system with its limited range of effectiveness provides the advantage that damage is prevented which may be caused by the interaction between the very big mass of the paving screed and the even bigger main mass of the road finisher and which would have to be reckoned with under extreme conditions if the dynamic absorber system had a more or less unlimited range of effectiveness.

On the other hand, the limited range of effectiveness of the absorber system suffices to suppress even the strongest pitch motions or rather to disturb these pitch motions from the very beginning such that a resonance effect is suppressed. An additional fact is that the dynamic absorber system is closely adapted to the structural preconditions existing in the case of a road finisher anyhow, and does not require any complicated structural modifications.

Still another embodiment permits an individual adaptation to the respective existing structural preconditions, the vibrations which are characteristic of the respective type of road finisher being easily governable by varying the preload or the spring stiffness and/or the damping properties.

In an additional alternative embodiment a simple frictional damper is used for causing the mass of the paving screed to become effective as an absorber mass in the dynamic absorber system. A large percentage of the energy can be consumed by the friction. If necessary, particularly effective friction surfaces and inclination angles of the frictional damper are chosen.

BRIEF DESCRIPTION OF THE DRAWINGS

Embodiments of the subject matter of the present invention are explained on the basis of the drawings, in which:

FIG. 4A shows the replacement system of an additional embodiment, FIG. 4B shows a structural solution belonging to the replacement system of FIG. 4A, and FIGS. 5 and 6 show associated views of an additional embodiment provided with a frictional damper.

DETAILED DESCRIPTION OF PREFERRED EMBODIMENTS OF THE INVENTION

Figure 1:
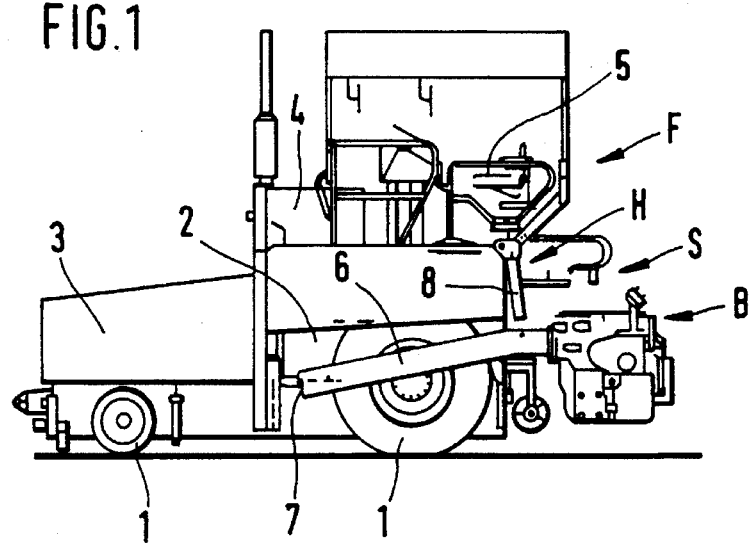
FIG. 1 shows a schematic side view of a road finisher travelling for the purpose of transportation.

A road finisher F is provided with a travelling gear 1 (a travelling gear equipped with tires or a tracklaying gear) on a chassis 2, said chassis 2 carrying a stock hopper 3 at the front and having provided therein a primary drive unit 4 as well as secondary drive units, which are not shown, and a driver's seat 5 arranged in a driver's cabin. The rear end of the road finisher F drags a paving screed B, which is articulated on the chassis at 7 via two lateral outriggers 6. A lifting device H comprising e.g. hydraulic lift cylinders 8 serves to raise the paving screed B to the transport position which is shown in FIG. 1 and at which the paving screed B has been raised from the ground and supported.

Figure 2A:
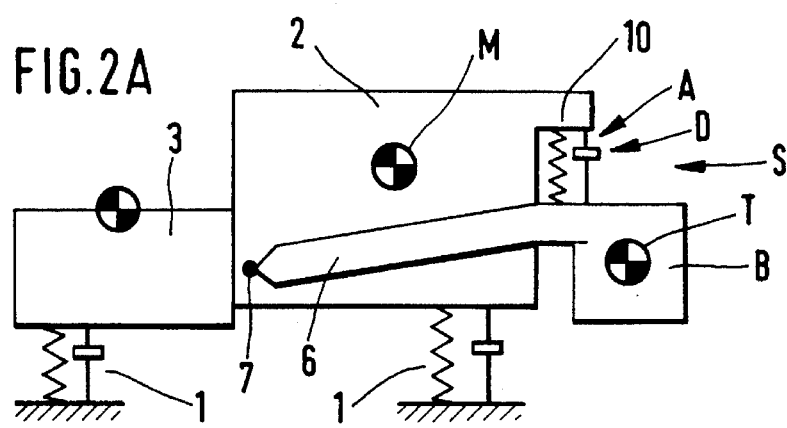
FIG. 2A shows a replacement system which symbolically represents the road finisher of FIG. 1.

FIG. 2A is a replacement system for the road finisher F according to FIG. 1. The masses of the stock hopper 3 and of the chassis 2 are symbolized as boxes containing the respective symbolized mass gravity centres. The main mass of the road finisher is outlined in M. Although it is not provided with any special suspension or cushioning systems, the travelling gear 1 causes resilient damping on the ground, e.g. due to the damping characteristics of the tires of the travelling gear which is equipped tires. The paving screed B, which is symbolized as a circular absorber mass located at the mass gravity centre of the paving screed, is attached via the outriggers 6 to an actuable, elastic support A and to a stationary abutment 10 of the chassis 2, said elastic support A comprising spring means and a damping device D, which define together with the absorber mass T a paving screed B and the chassis 2 occurring predominantly in the vertical direction and which prevents excessive pitch motions of the road finisher F.

Figure 2B:
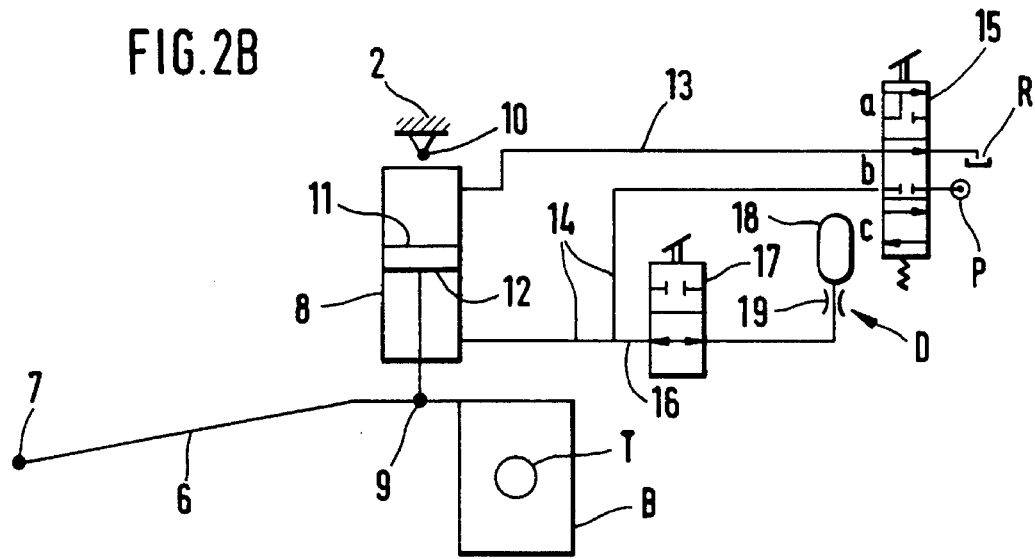
FIG. 2B shows a variation of details of FIG. 1 and 2A.

In FIG. 2B, the actuable, elastic support A of the dynamic absorber system is shown in a block diagram. Each lift cylinder 8 of the lifting device H has a piston lowering side 11 and a piston lifting side 12, which are adapted to be hydraulically acted upon. The piston rod is articulated on the outrigger at 9. The cylinder is suspended from the abutment 10 of the chassis 2. Hydraulic lines 13, 14 connect the lift cylinder 8 to the multi-way valve 15, e.g. a 4/3-way valve, which is actuated by hand or magnetically or hydraulically and which is adapted to be changed over between three positions a, b and c. The multi-way valve 15 has connected thereto a pressure source P and a tank R. An auxiliary line 16 branches off the hydraulic line 14 and leads to at least one accumulator 18 which defines the elastic support A and which is adapted to be actuated by means of a control valve 17 arranged in said auxiliary line 16. At least one damping restrictor 19, which serves as a damping means D, is arranged between the lift cylinder 8 and the accumulator 18.

At the so-called floating or lowered position a, the multi-way valve 15 connects both hydraulic lines 13, 14 to the tank. The pressure source P is blocked. At the transporting or supported position b, only the hydraulic line 13 is connected to the tank R, whereas the hydraulic line 14 is blocked. At the raised position c, the hydraulic line 13 is connected to the tank R; the pressure source P is connected to hydraulic line 14. The control valve 17 is, in an expedient manner, connected to the control of the multi-way valve 15 in such a way that it will switch through (as shown) exclusively at the transport or supported position b of said multi-way valve 15. When the absorber mass T carries out a lowering motion, pressure medium will be displaced into the hydraulic line 14 from the piston lowering side 11, and this pressure medium will then enter the accumulator 18 via the control valve 17 and the damping restrictor 19; the accumulator 18 will yield and absorb this increase in pressure. At the same time, energy will be consumed in the damping restrictor 19. When the absorber mass T carries out a lifting motion, pressure medium will be urged out of the accumulator 18 through the damping restrictor 19. The piston lifting side 12 displaces pressure medium through the hydraulic line 13 into the tank. Relative vibrations between the main mass M and the absorber mass T, which are caused by roughness of the road or by other external influences, are at least partially damped and eliminated in this way.

Figure 3A:
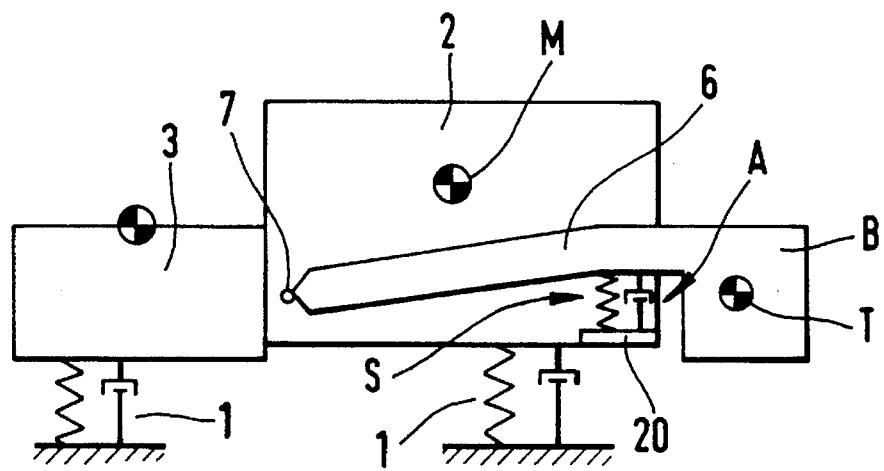
FIG. 3A shows a replacement system of a different embodiment.

FIG. 3A is a representation of a replacement system for the road finisher in the case of which the dynamic absorber system S with the actuable, elastic support A is arranged between a lower, stationary bearing 20 of the chassis 2 and each outrigger 6. Lowering motions of the absorber mass T relative to the main mass M and anticlockwise tilting motions of the main mass M relative to the absorber mass T are absorbed and damped by the elastic support.

Figure 3B:
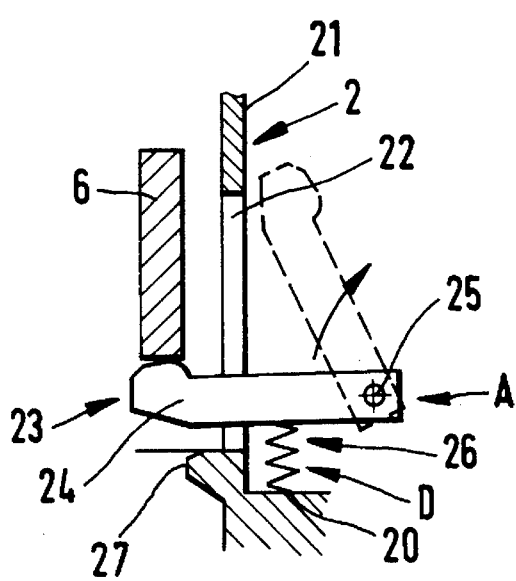
FIGS. 3B and 3C show structural embodiments belonging to FIG. 3A.

In a first structural design of the elastic support A according to FIG. 3B, a stop member 23, viz. a locking member 24, is pivotably supported at 25 behind a side wall 21 of the chassis 2. With the aid of an adjusting drive means which is not shown, said locking member 24 can be pivoted from its passive position outlined by broken lines through an opening 22 in the side wall 21 to a position below the raised outrigger 6. The locking member 24 rests on a damping spring means 26, which, in turn, rests on the abutment 20. A stationary limit stop 27 is provided in the path of movement followed by the locking member 24 under the load applied by the outrigger, the locking member 24 being adapted to be stopped by said limit stop 27 while bridging the spring means 26.

Figure 3C:
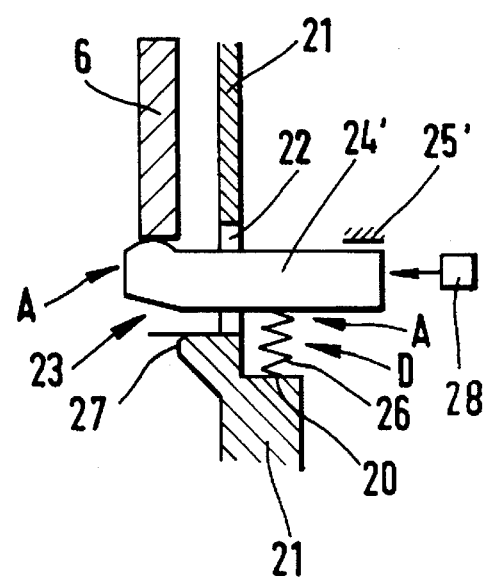

In the embodiment according to FIG. 3C, the stop member 23 is a linearly displaceable locking member 24', which is adapted to be moved through the opening 22 in the side wall 21 to a position below the outrigger 6 and which is adapted to be supported by a support 25' on the one hand and by the spring means 26 on the other. A mechanical, hydraulic, pneumatic or electrical adjusting device 28 serves to insert and remove the locking member 24'. A stationary limit stop 27 is additionally provided in the path of movement followed by the locking member 24' under the load applied by the outrigger.

FIG. 4A is the replacement system for a different embodiment of the road finisher, in which the actuable elastic support A is provided between an abutment 29 on the back of the chassis 2 and the underside of the outrigger 6. FIG. 4B shows a sectional view of one structural design of this support A. On a back wall 30 bordering on the side wall 21 and constituting part of the chassis 2, a housing 31, which serves as a stop member 23, is adapted to be removed from and reattached to anchoring points 32 in such a way that, at the passive position (shown by broken lines), it is located outside of the path of movement of the outrigger, whereas, at the transport position (shown by solid lines), it is located in the path of said outrigger 6. In the interior of the housing 31, the spring means 26 is supported, the outrigger 6 resting on said spring means 26 via a vertically displaceable piston 33. A stationary limit stop is established between the upper side of the housing 31 and a collar 27' of the piston 33 as soon as the spring means 26 has been compressed to a sufficient extent.

FIGS. 5 and 6 show a frictional damper as an elastic support A for the outrigger 6. The outrigger 6 has provided thereon e.g. a sleeve 34, which is adapted to be displaced from the transport position shown by solid lines to a passive position shown by broken lines. At both positions, the sleeve 34 is secured in position with the aid of a locking means 35, 36. Both sides of said sleeve 34 have attached thereto friction blocks 37 with downwardly converging friction surfaces, said friction blocks 37 penetrating, at the transport position, into a space between friction blocks 40, which are also provided with oblique friction surfaces 41. The friction blocks 40 are adapted to be displaced in transverse guide means against spring means 26'. On the underside of the sleeve 34, a limit stop, e.g. a resilient buffer 38, is provided, said limit stop being adapted to be placed onto a counter-surface 43 of an abutment 42. At the passive position, which is shown by a broken line, the distance which the outrigger 6 can move downwards will suffice for the normal operating movements of the paving screed B.

In the case of the embodiments according to FIG. 3A to 6, it will be expedient when the lifting device is hydraulically decoupled at the transport position of the paving screed B, i.e. the lift cylinders 8 are caused to assume the floating position by means of the multi-way valve 15, so that the mechanical-dynamic absorber system S will become effective.

The dynamic absorber system is, in principle, a resonant system which counteracts the pitch vibrations of the road finisher, the paving screed B acting as an absorber mass when the road finisher is caused to vibrate. The hitherto unavoidable and partly very strong pitch motions of the road finisher are markedly reduced, and this will especially make things easier for the driver on the seat of the road finisher and it will improve road safety.

Having described preferred embodiments of the present invention, it is to be understood that modifications thereof falling within the spirit of the invention may become apparent to those skilled in the art, and the scope of the present invention is to be determined by the appended claims and their equivalents.

What is claimed is:

1. In a road finisher having a chassis, which is movable on a travelling gear and which carries a front stock hopper, a primary drive unit, a paving screed which is dragged at the rear and which is articulated on said chassis via lateral outriggers, and a lifting device which is provided between said chassis and said outriggers and by means of which the paving screed can be moved to a transport position raised from the ground, the improvement comprising a dynamic absorber system comprising an (i) actuable support for supporting the paving screed while the screed occupies the transport position, wherein the screed is attached via the outriggers to the actuable support and to the chassis, the actuable support being elastic relative to the chassis in the vertical direction, and (ii) an absorber mass defined by the paving screed.

2. A road finisher according to claim 1, the support further including damping means.

3. A road finisher according to one of the claims 1 or 2, wherein the lifting device comprises hydraulic lift cylinders suspended from the chassis and connected to the outriggers, which are incorporated in a hydraulic control circuit, at least one accumulator connected to said control circuit provided as the elastic support, and at least one adjustable damping restrictor is inserted between said accumulator and each lift cylinder.

4. A road finisher according to claim 3, wherein each of the lift cylinders has a piston lifting side and a piston lowering side and is connected to a multi-way valve via hydraulic lines, said multi-way valve being adapted to be changed over between a (i) raised position at which the piston lifting side is connected to a pressure source and the piston lowering side is connected to a pressure medium tank, (ii) a lowered position at which the piston lifting and lowering sides are connected to the tank and (iii) a transport/supported position at which the piston lifting side is separated from the tank and from the pressure source, the piston lowering side is connected to the tank, and a hydraulic line leading from the piston lifting side to the multi-way valve is adapted to be connected to the accumulator via an auxiliary line and a control valve adapted to be switched through at the transport/supported position of the multi-way valve.

5. A road finisher according to one of the claims 1 or 2, wherein the lifting device comprises hydraulic lift cylinders, which are incorporated in a hydraulic control circuit, and the elastic support comprises a mechanical stop member for each outrigger, said stop member being adapted to be displaced to a transport position and to be moved up and down relative to a stationary bearing of the chassis, and a hydraulic, mechanical, pneumatic or combined spring means with hydraulic, pneumatic, mechanical or friction damping is arranged between said stop member and said bearing or between said stop member and said outrigger.

6. A road finisher according to claim 5, wherein a stationary limit stop is provided in the path of movement followed by the stop member under the load applied by the outrigger.

7. A road finisher according to claim 5, wherein the stop member is a locking member, which is adapted to be pivotably moved or linearly pushed to a position below the raised outrigger, said locking member resting on the spring means at least at a transport position at which it extends below the outrigger.

8. A road finisher according to claim 7, wherein the locking member is adapted to be moved to the position below the raised outrigger through a side wall of the chassis.

9. A road finisher according to claim 7, further including a mechanical, hydraulic, pneumatic or electrical adjusting device for the moving locking member.

10. A road finisher according to claim 5, wherein the stop member is a housing, which is adapted to be changed over at the back wall of the chassis between a first position associated with the operative condition of the road finisher and located outside of the range of movement of the outrigger and a second position associated with the transport condition of the road finisher and located in the path of movement of the outrigger, said changing over being effected by removing the housing and by reattaching it at the respective other position, the spring means are accommodated in the housing, and, at the transport position of the housing, the outrigger is adapted to be placed on said spring means by an intermediate piston which is supported by said spring means.

11. A road finisher according to claim 10, wherein the stationary limit stop is arranged between the piston and the housing.

12. A road finisher according to claim 5, wherein the spring means is adapted to be adjusted with respect to its preload or damping properties.

13. A road finisher according to claim 1, wherein the elastic support is provided with a non-self-locking frictional damper for the outrigger.

* * * * *